United States Patent [19]

Acker

[11] Patent Number: 4,538,640

[45] Date of Patent: Sep. 3, 1985

[54] MULTIPOSITION SELECTOR VALVE

[75] Inventor: Richard C. Acker, Chagrin Falls, Ohio

[73] Assignee: Teledyne Republic Manufacturing, Cleveland, Ohio

[21] Appl. No.: 430,770

[22] Filed: Sep. 30, 1982

Related U.S. Application Data

[63] Continuation-in-part of Ser. No. 351,996.

[51] Int. Cl.³ .............. F15B 11/00; F16K 31/44
[52] U.S. Cl. .............. 137/596; 137/625.11;
137/635; 251/241; 251/284; 251/361; 74/102;
91/170 MP; 91/536
[58] Field of Search .............. 137/625.11, 614.11,
137/635, 596; 251/297, 241, 360, 361, 363, 99,
96, 246, 284; 91/536, 467, 170 MP; 74/102, 104

[56] References Cited

U.S. PATENT DOCUMENTS

| | | | |
|---|---|---|---|
| 1,357,667 | 11/1920 | Williams | 251/241 |
| 1,504,496 | 8/1924 | Peck | 74/102 |
| 2,237,377 | 4/1941 | Thwaits | 251/241 |
| 2,451,678 | 10/1948 | Johnson et al. | 251/361 |
| 2,482,223 | 9/1949 | Strid et al. | 251/241 |
| 2,609,207 | 9/1952 | Von Sickle | 137/635 |
| 2,626,123 | 1/1953 | Daniels | 251/360 |
| 2,655,167 | 10/1953 | Dunkelow | 91/536 |
| 2,700,984 | 2/1955 | Gleasman | 137/625.11 |
| 3,041,886 | 7/1962 | Atherton | 74/102 |
| 3,246,667 | 4/1966 | Pemberton | 137/625.11 |
| 3,319,531 | 5/1967 | Sanders | 91/536 |
| 3,687,163 | 8/1972 | Nickels | 137/625.11 |

FOREIGN PATENT DOCUMENTS 675257  7/1979  U.S.S.R. .............. 251/99

Primary Examiner—A. Michael Chambers
Attorney, Agent, or Firm—Pearne, Gordon, Sessions, McCoy, Granger & Tilberry

[57] ABSTRACT

A multiposition selector valve of the rotary type includes a valve body having a single inlet port and a plurality of outlet ports. Fluid communication between the inlet port and any one of the outlet ports is provided via a check valve assembly mounted on the valve body, and via a fluid-providing conduit connected at one end to the inlet port via the check valve. The other end of the conduit is movable in rotary fashion for fluidtight engagement with any one of a plurality of valve seat areas associated with the outlet ports. The valve seat areas are integral portions of a flat metal disk that can be removed from the valve body to facilitate maintenance of the valve. A single handle rotates the conduit through its various selected outlet positions and operates the check valve assembly to open and close the valve at selected outlet positions.

12 Claims, 6 Drawing Figures

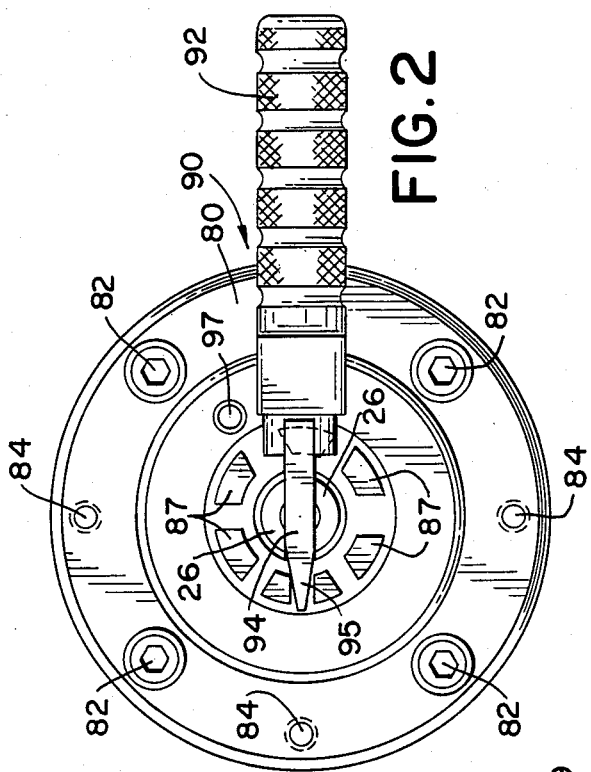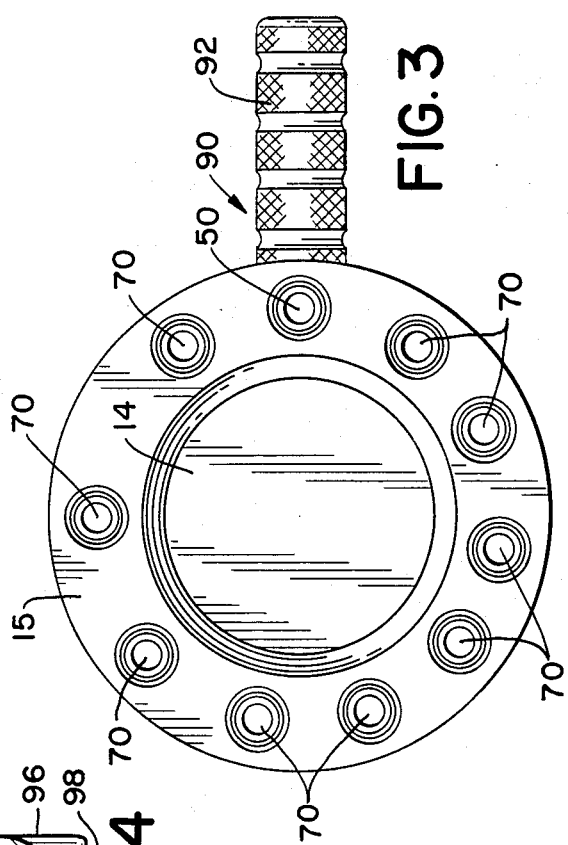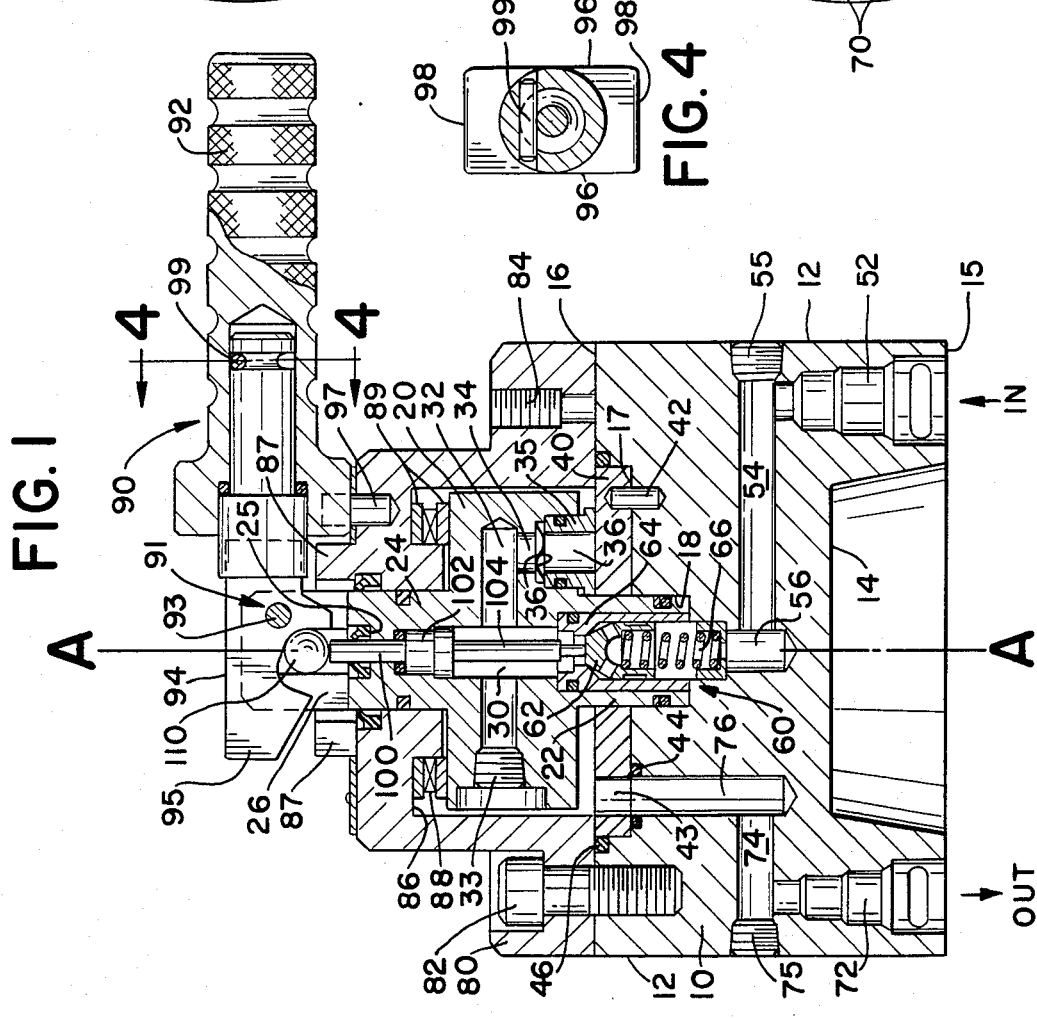

MULTIPOSITION SELECTOR VALVE

This is a continuation-in-part of my copending application Ser. No. 351,996, filed Feb. 24, 1982, and now abandoned.

BACKGROUND OF THE INVENTION

The present invention relates in general to fluid valves, and in particular to a multiposition selector valve of the rotary type.

It is known in the art to provide a selector valve having an inlet port and a plurality of outlet ports. A rotor member includes a conduit for providing fluid communication between the inlet port and a selected one of the outlet ports dependent on the rotational position of the rotor member. A check valve assembly in series with the conduit and the inlet port is opened by a push rod actuated by a leverlike, pivotally mounted handle carried on an extended portion of the rotor, the single handle rotating the rotor member and operating the check valve. Such a prior art valve also includes an annular spring-biased seal element that is carried by the rotor member at the outlet of the conduit provided by such rotor member. The seal element can engage each outlet port in fluidtight relationship, as the rotor moves, to establish fluid communication between the inlet port and the selected outlet port via the check valve, the conduit, and the seal element. The outlet ports are positioned in a circle on a flat portion of the valve body upon which the seal element rides, wherein the seal element can be closed by sections of the flat portion between the outlet ports.

When the flat portion of the valve body engaging the seal element becomes worn or otherwise damaged, the valve must be completely disassembled and then an attempt can be made to regrind the flat portion to ensure fluidtight communication with the seal element as it rides along a circular path on the flat portion from one outlet port to another. If regrinding of the flat portion is not possible, then the complete valve body must be replaced at high cost.

Further, where a valve of the type noted is utilized in high pressure application, the interconnection between the push rod and the handle must minimize frictional forces so that as much force as possible is applied directly to the check valve assembly, only a minimal portion of the applied force being utilized to overcome frictional losses in the linkage between the handle and the check valve assembly In addition, in such high pressure applications, it is desirable in certain valve positions to preclude full opening of the check valve when the rotor member is not properly aligned to completely engage the seal element with one of the outlet ports, such preclusion minimizing leakage that may occur at some valve positions at the interface area of the seal element and sections of the flat portion intermediate the outlet ports.

SUMMARY OF THE INVENTION

A multiposition selector valve of the rotary-type is provided having at least one inlet port and a plurality of outlet ports. The valve includes a rotatable member or rotor member providing a conduit for establishing fluid communication between the inlet port and a selected one of the outlet ports.

In accordance with the present invention, a platelike member is removably mounted in fixed position within the valve. The platelike member includes a plurality of apertures each associated with and in fluid communication with a corresponding one of the outlet ports. An end of the conduit provided by the rotatable member sealingly engages the plate in fluidtight relationship to provide fluid to the outlet ports via the apertures provided by the platelike member.

Such an arrangement greatly enhances the maintainability of the valve, since the platelike member can easily be removed for regrinding or replacement at low cost.

Further, a valve is provided having a leverlike operating handle pivotally mounted on the valve. A linearly movable push rod element is actuated by the handle and extends into the interior of the valve to engage and operate a check valve assembly contained therein.

In accordance with the present invention, a rigid ball member is positioned between the handle and the push rod. Pivotal movement of the leverlike handle applies a moving force to the push rod solely via the ball member to open the check valve assembly. Such an arrangement minimizes the frictional forces that must be overcome when opening the check valve assembly which may be controlling a high pressure fluid source.

Other aspects of the invention include the provision of seal means for the platelike member and the provision of guides and stops for precluding operation of the valve under certain conditions.

In one embodiment of the invention, the rotor member is journaled by both the valve body and an associated cap member. In another embodiment, only the cap member journals the rotor member for rotation, the cap member positioning the rotor member on the apertured platelike member.

BRIEF DESCRIPTION OF THE DRAWING

A fuller understanding of the invention may be had by referring to the following description and claims, taken in conjunction with the accompanying drawings, wherein:

FIG. 1 is an elevational view of a multiposition rotary selector valve, in accordance with a first embodiment of the present invention, with portions cut away;

FIG. 2 is a top view of the valve;

FIG. 3 is a bottom view of the valve;

FIG. 4 is a view taken along line 4—4 of FIG. 1;

DETAILED DESCRIPTION OF THE PREFERRED EMBODIMENTS

Figure 5:
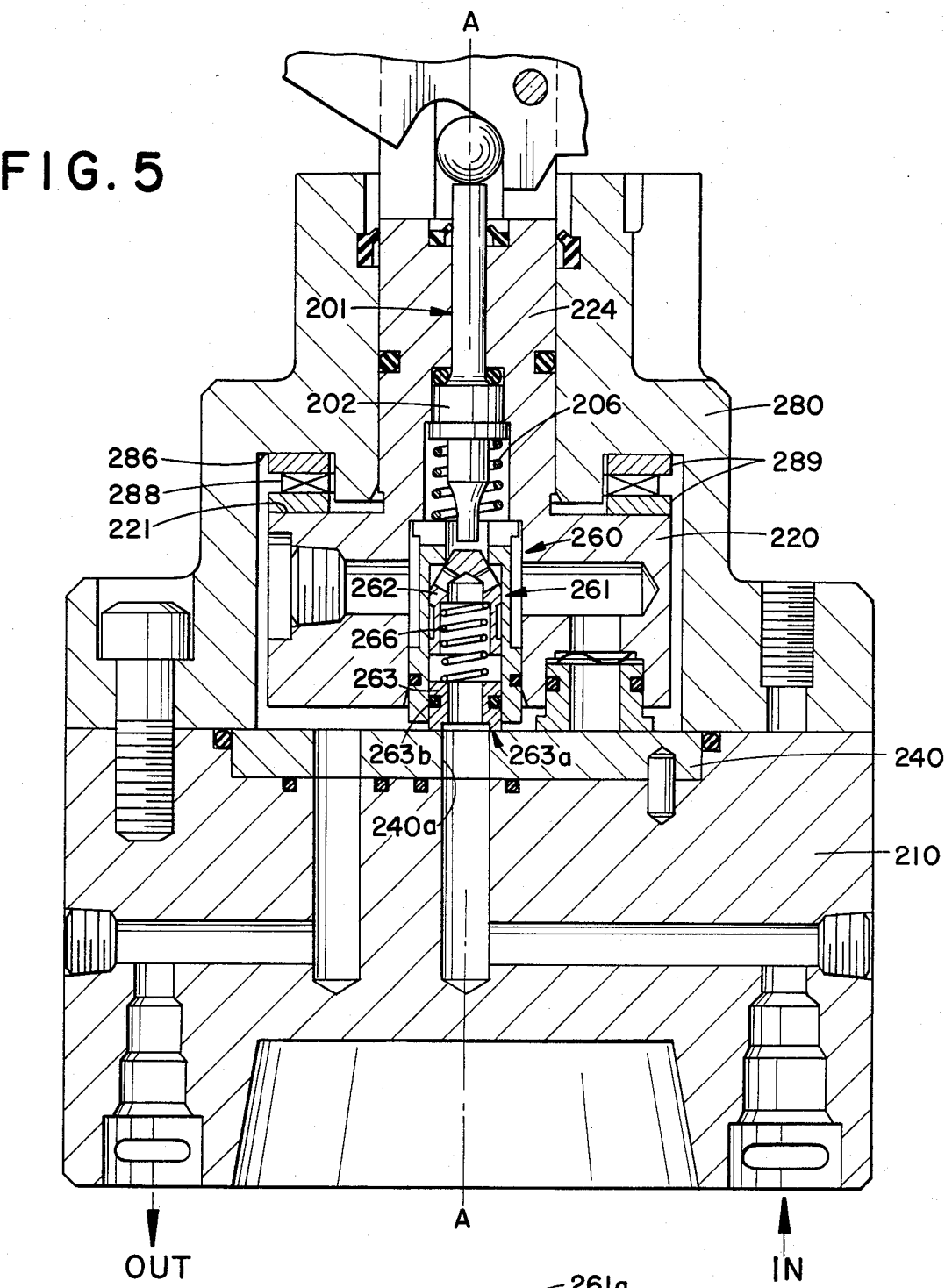
FIG. 5 is an elevational view of a multiposition rotary selector valve, in accordance with a second embodiment of the present invention, with portions cut away.

With reference to FIG. 1, there is illustrated a first embodiment of a multiposition selector valve of the rotary type in accordance with the present invention. The valve includes a cylindrically-shaped valve body 10 having a circular outer wall 12. The bottom face of the valve body 10 includes a recessed central surface 14 of circular shape. The bottom face further includes an annularly extending peripheral surface 15 that coaxially surrounds the recessed central surface 14. In similar fashion, the top face of the valve body 10 includes a recessed central surface 17 of circular configuration coaxially surrounded by an annularly extending peripheral surface 16. The recessed central surface 17 of the top face of the valve body 10 is further provided with a centered bore defined by a circularly extending wall 18, as illustrated.

A rotatable member of generally cylindrical shape constitutes a rotor 20 having a lower section 22 in the form of an annular sleeve and an upper section 24, also in the general form of an annular sleeve, the rotor 20 and its sections 22,24 being coaxial relative to each other and being rotatable on an axis A—A illustrated in FIG. 1. The lower section 22 of the rotor 20 is slidably received and journaled within the central bore defined by the wall 18 of the valve body 10. Appropriate elastomeric seal rings of, for example, the O-ring type are provided at the lower portion of the interface area between the lower section 22 and the wall 18 to preclude leakage of fluid between such members, such seals being well known in the art. The rotor 20 is journaled within the bore defined by the wall 18 for free rotation of the rotor relative to the valve body. The rotor 20 is further provided with an axial rotor conduit section 30. The conduit section 30 is constituted by a bore of varying diameter that extends through the rotor 20 along its axis of rotation from one end of the rotor to the other. Connected to the center portion of the conduit section 20, and in fluid communication therewith, is a transverse rotor conduit section 32 that is provided, for example, by transverse drilling of the rotor, the outer end of the conduit section 32 being closed by a suitable tapered pipe plug 33. This manufacturing technique for providing the transverse rotor conduit section 32 is well known in the art, and need not be further discussed. The rotor 20 is further provided with a radially positioned rotor conduit section 34 that lies along an axis parallel to the axial rotor conduit section 30 but radially spaced from it, so that the section 34 revolves about the axis A—A of the section 30 as the rotor 20 rotates. Located at the distal end of the radial rotor conduit section 34 is an annular seal element 35 spring-biased toward the valve body 10 by a suitable biasing spring 36, suitable elastomeric seals of the O-ring type establishing a fluid-tight relationship between the linearly movable sliding seal element 35 and the rotor 20.

Positioned between the rotor 20 and the valve body 10 is a platelike member in the form of a flat metal disk 40 that is slidably received within the recess in the center of the upper face of the valve body. The bottom of the flat metal disk 40 rests on the recessed central surface 17, as illustrated, a detent means in the form of a pin 42 being received in a suitable blind bore in the disk 40, and the pin 42 being anchored in another suitable blind bore in the surface 17. The pin 42 acts as an index means to properly position the disk and prevents the flat metal disk 40 from rotating in the recess on the top face of the valve body 10. The platelike member constituted by the flat metal disk 40 includes in its center a circular inlet aperture through which the lower section 22 of the rotor extends, such lower section 22 being rotatable in the central aperture of the disk 40. Further, a plurality of outlet apertures 43 (only one shown) in the disk 40 extend in circular fashion about the periphery of the disk 40, such apertures being spaced an equal radial distance from the center of rotation of the rotor 20, but not being necessarily equidistantly spaced circumferentially. The circularly extending outlet apertures in the disk 40 are generally aligned with and in fluid communication with inner ends 76 (only one shown) of a plurality of outlet ports 70 (see FIG. 3). The flat metal disk 40 is provided at its periphery with an elastomeric seal in the illustrated form of an O-ring 46 that engages the outer periphery of the disk and seals it to preclude leakage of fluids between the disk and adjacent portions of the valve. Further elastomeric seal means associated with the disk 40 include an O-ring 44 located beneath the disk 40 at each outlet aperture 43.

The flow of fluid through the valve structure as thus far described will now be illustrated, it being understood that the disk 40 includes a plurality of outlet apertures 43 corresponding in number to a plurality of outlet ports 70 (FIG. 3) provided by the valve body 10.

With reference to FIGS. 1 and 3, an inlet port 50 has an outer end 52 for receiving fluid from a suitable supply which is, for example, a high-pressure hydraulic fluid source. A suitable hydraulic connector or coupling engages the outer end 52 of the inlet port 50 so as to provide fluid to a transverse conduit portion 54, such portion 54 being formed in a conventional manner and having its outer access end closed by a suitable pipe plug 55. The transverse conduit portion 54 is in fluid communication with an inner end 56 of the inlet port 50 and is centrally located and lies along the axis of rotation of the rotor 20.

A removable check valve assembly 60 includes a poppet 62 engageable with a seating surface 64, the poppet 62 being biased against the seating surface 64 by a suitable check valve spring 66. The check valve assembly 60 is positioned within the lower end of the axial rotor conduit section 30 of the rotor 20 and closes the open end of the inlet port inner end 56. Suitable sealing means are provided to ensure fluidtight relationship between the check valve assembly 60 and the axial rotor conduit section 30.

It can be seen that when the check valve 60 is opened (the check valve assembly 60 is shown in a closed position in FIG. 1) by means to be subsequently described, fluid provided from a source to the inlet 50 will move through the inlet conduit sections 52, 54, 56 through the check valve 60 into the axial rotor conduit section 30. Such pressurized fluid will then flow via the transverse rotor conduit section 32 to the radial rotor conduit section 34 in fluid communication with the annular seal element 35 that is biased toward and rides against the upper surface of the flat metal disk 40, such upper surface of the disk 40 acting as a valve seat.

For purposes of illustration, FIG. 1 only illustrates a single outlet port in cross section, such outlet port being one of nine outlet ports 70, as shown in FIG. 3. Each outlet port as shown in FIG. 1 includes an outer end conduit portion 72 in fluid communication with a transverse outlet conduit portion 74, which in turn is in fluid communication with an inner end of the outlet port 76.

It can be seen that an outlet aperture 43 in the disk 40 is aligned with the inner end 76 of the outlet port illustrated. It can further be seen that fluid provided to the inner end 76 of the outlet port will travel through the transverse conduit portion 74 (whose access end is also closed by a suitable pipe plug 75), such fluid then moving out of the valve body via the outer end 72 of the outlet port, having a suitable hydraulic connector fastened to it.

When the rotor 20 is rotated approximately 180 degrees from the position illustrated in FIG. 1, the seal element 35, which provides a sealing effect of the well-known differential pressure shear-type relative to the upper surface of the disk 40, will be aligned over the inner end 76 of the illustrated outlet port, wherein fluid flow will occur from the inlet port 50 to the illustrated selected outlet 70 via the route discussed above. This fluid flow is initiated by opening the check valve once the revolving fluid providing seal element 35 is at a selected outlet position on the disk 40.

As shown in FIG. 3, the valve includes a single inlet port 50 and nine outlet ports 70, the disk 40 thus having a central aperture for allowing a fluid inlet and nine peripheral outlet apertures 43 to communicate with the nine outlet ports 70. It is to be recognized that more or less outlet ports could be provided.

In accordance with the present invention, it is to be noted that the disk 40, upon disassembly of the valve, can be easily removed for grinding its upper surface, or the entire disk 40 can be replaced where, due to excessive wear, the flat upper face of the disk 40 is worn or damaged so as not to properly engage in fluidtight relationship with the bottom face of the seal element 35 as it rides around in a circle on the disk. Preferably, both the disk 40 and the seal element 35 are formed of stainless steel to provide good wear characteristics.

To maintain the rotor 50 in proper position against forces generated by pressurized fluid flow, a rotor-retaining cap member 80 rests on the top face of the valve body 10 and is fastened thereto by a plurality of cap screws 82, as illustrated in FIGS. 1 and 2. The cap member 80 further includes a plurality of threaded holes 84, which permit fastening of the valve into position on a structure (not shown), such as a hydraulically operated tunneling machine. The cap member 80 is hat-shaped and includes as an interior wall portion a bearing support surface 86 of annular extension, the bearing support surface 86 being associated with an annularly shaped ring bearing 88 positioned between a pair of bearing races 89, the upper one of which engages the surface 86 while the lower one engages the top of the rotor 20. The structure comprised of the bearing 86 and the races 89 bears against the top of the rotor 20 to hold it in position relative to the disk 40. Inner edge portions of the cap member 80 overlap the edge of the disk 40 to retain it in position on the top face of the valve body 10. The bearing 8D8 permits free rotation of the rotor 20 while ensuring that the rotor 20 remains solidly journaled within the bore defined by the wall 18 so as not to permit any axial movement of the rotor along its axis of rotation caused by high fluid pressure experienced at the interface of the seal element 35 and the disk 40. As the rotor 20 rotates, the sealing element 35, which is movable to a slight degree relative to the rotor 20, can thus ride along the upper surface of the disk 40 from one outlet port to another.

The top portion of the cap member 80 includes an aperture that receives in journaled fashion the upper section 24 of the rotor 20, suitable sealing means being utilized to preclude fluid leakage between the rotor section 24 and the cap member 80. On the top surface of the cap member 80 surrounding the upper rotor section 24 there is provided a plurality of raised projections or castellations 87 that extend in annular fashion about the axis of rotation of the rotor. The function of such castellations 87 (see FIGS. 1 and 2) will be subsequently explained.

Means for operating the check valve assembly 60 will now be discussed. A pivotally mounted, leverlike handle 90 is held in position at a fulcrum point by a pin joint 91. The handle 90 is formed of two primary parts, namely a graspable handle end 92 and a push rod engaging handle end 94, such handle ends being rotatable relative to each other by means to be subsequently detailed. A pin 93 extends in transverse fashion through the push rod engaging handle end 94, the ends of the pin 93 being received in a spaced pair of cage-forming elements 26 that each constitute a semicircular leg that extends upwardly from the upper section 24 of the rotor 20. The cage-forming elements 26 are most clearly illustrated in FIG. 2, wherein it can be seen that such elements are spaced from each other by a distance slightly greater than the width of the push rod engaging end 94 of the handle 90 to permit lifting and lowering of the handle in pivotal fashion wherein, upon raising the graspable end 92 of the handle 90, a lowering of the push rod engaging end 94 of the handle 90 will occur (i.e., a lowering of that portion of the handle end 94 extending to the left of the fulcrum point 91 as viewed in FIG. 1). This pivoting, leverlike motion is transferred via a rigid ball member 110 to an upper portion 100 of a push rod having an enlarged center portion 102 and a lower poppet engaging portion 104. The ball 110 is loosely retained in position between the handle portion 94 and the top of the upper portion 100 of the push rod by the cage-forming semicircular element 26. The ball 110 is preferably a hardened steel ball. The push rod constituted by its sections 100, 102, and 104 is linearly movable along the axis of rotation A—A of the rotor 20 and is generally completely enclosed by the rotor 20, the push rod being positioned within the upper end of the axial rotor conduit section 30. Appropriate seals are provided about the upper portion 100 of the push rod to preclude leakage of fluid from the axial rotor conduit section 30 out of the top of the rotor 20.

It can be seen that the check valve 60 is in a normally closed condition, due not only to the effect of the biasing spring 66 but also to the force of high pressure fluid applied at the inlet 50 via the associated inlet port sections 52, 54, 56. To open the valve, the operator grasps the handle end 92 and raises it, wherein the handle 90 will pivot on the pin joint 91 and push down on the push rod portion 100 via the hardened steel ball 110, which, because of its minimal area of contact with the top of the push rod portion 100 and the handle portion 94, provides very little friction that must be overcome. Thus, essentially all of the force applied in raising the handle to an upward position is directly transferred via the push rod to the poppet 62 to move it away from its associated seat 64.

It can further be seen from FIG. 1 that the diameter of the ball 110 is greater than the diameter of the upper end 100 of the push rod so that as the ball moves downward, it will eventually engage a stop 25 located at the top of the upper rotor section 24, wherein further downward movement of the push rod is precluded. Thus, the degree of full opening of the check valve 60 is limited in a simple and straightforward, yet reliable manner. The left end (as viewed in FIG. 1) of the graspable handle portion 92 of the handle 90 includes (as further illustrated in FIG. 4) a handle lock portion of rectangular cross section. This portion of the handle includes opposed, parallel, flat surfaces 96 and opposed, parallel, raised surfaces 98 that are radially spaced a greater distance from the longitudinal axis of the handle than are the flat surfaces 96. A pin 99 locks the handle portions 92 and 94 together in a conventional manner to preclude axial movement of such portions relative to each other, while permitting rotation of the handle end 92 relative to the handle end 94 so that the portion of the handle illustrated in FIG. 4 can have either the flat surfaces 96 or the raised surfaces 98 in a horizontal plane (as viewed in FIG. 1).

A pin 97 is provided on the top of the cap member 80 and extends perpendicularly upwardly from it such that rotation of the handle 90 is blocked when the handle is in the position illustrated in FIG. 1, since the pin will interfere with the movement of the handle. If the handle is rotated 90 degrees from the position illustrated in FIG. 1, one of the flats 96 will be in a horizontal plane so as to be spaced from and clear of the top of the pin 97. Thus, the handle can be completely rotated in clockwise or counterclockwise direction without interference from the pin 97.

With further reference to FIG. 2, the castellations 87 are illustrated. These castellations 87 function as stops to preclude the full tilting of the handle 90 so as to preclude complete opening of the check valve assembly 60 without the rotor 20 being properly positioned over an outlet port or in desired relation to a pair of outlet ports. With reference to FIGS. 1 and 2, a stop portion 95 at the distal end of the handle end 94 extends out over the castellations 87 as the handle is rotated from one outlet port selection position to another. When the portion 95 is between castellations, the handle can be tilted upward to provide a force via the push rod for complete opening of the check valve assembly 60. To rotate the valve to another position, the handle 92 must be lowered to close the check valve, and then it can be rotated to another position, with the stop portion 95 of the handle again between castellations wherein the valve can be turned on by raising the handle 90.

It is to be noted that the pin 97, in addition to functioning as a rotation stop for the handle 90, can also be used to support the handle in a raised position to lock the valve in an open condition, either of the surfaces 98 resting on the top of the pin 97. To lock the handle in an UP (valve open) position, using the pin 97 as a rest or stop, the operator would rotate the handle 90 degrees from the position illustrated in FIG. 1. The handle would then be revolved to a position wherein the handle was above the pin 97. The handle would then be raised to turn on the valve at such position, and the handle would be rotated to position one of the surfaces 98 adjacent to the top end of the pin 97. The operator could then release the handle 90 and it would be resting on and supported by the upper end of the pin 97, the check valve 60 being held in an open position without operator assistance.

It is to be further noted that while one pin 97 is illustrated in FIG. 2, other pins could be provided to provide means for locking the valve in an open position at other positions. It is also to be noted that pairs of castellations may be spaced from each other by a distance permitting the sealing element 35 to slide between two outlet ports without the need for closing the check valve assembly 60. Such an operation would be desirable where, for example, an operator was hydraulically moving an element up and down, it being undesirable to close the check valve between such up or down motions. In accordance with the invention, the castellations preclude the opening of the check valve 60 when the sealing element 35 is positioned between outlet ports (except where that castellation spacing by design permits such valve movement). Such a feature minimizes the chance of leakage between the seal element 35 and the disk 40, since the check valve assembly 60 will normally be closed as the valve seal element 35 moves from one outlet to another.

With reference to FIG. 5, there is illustrated a second embodiment of the present invention, such second embodiment including numerous elements identical to those discussed with regard to FIGS. 1 through 4, such identical elements being apparent and not requiring repeated discussion The valve of FIG. 5 includes a valve body 210, the valve body 210 providing an inlet port and a plurality of outlet ports that engage in fluidtight relationship with an apertured platelike disk member 240 generally identical to the disk 40 discussed with regard to FIGS. 1 through 4. Unlike the disk 40 of FIGS. 1 through 4, the central or inlet aperture defined by circular wall 240a of disk 240 is of a smaller diameter than the central aperture of disk 40 (FIG. 1), since such central aperture does not have to receive and journal the lower section 22 of the rotor 20, as taught by the embodiment of FIG. 1.

A cap member 280 is mounted on the valve body 210, the cap member 280 having a central bore for rotationally journaling in bushinglike fashion an upper, reduced diameter, extended section 224 of the rotor 220. Unlike the earlier embodiment of the invention illustrated in FIGS. 1 through 4, the rotor 220 of FIG. 5 is rotationally supported solely by the cap member 280 in association with a ring bearing 288 positioned between two bearing races 289, the upper one of which engages a bearing support surface 286 provided by the cap member 280, the lower of the races 289 engaging a top annular surface 221 of the rotor member 220.

In further accordance with the second embodiment of the invention, a check valve assembly 260 is mounted within the center bore of the rotor 220, the check valve assembly 260 being comprised of a check valve sleeve 261, a check valve poppet 262, and a check valve inlet seal member 263, the poppet 262 and the seal member 263 being separated from each other by a poppet biasing spring 266. It can be seen that the check valve poppet 262 and the seal member 263 are slidably received for linear movement to a limited extent within the sleeve 261. The check valve assembly 260 is biased toward the disk 240 by a push rod biasing spring 206 positioned between an enlarged center portion 202 of a push rod 201 for operating the check valve assembly 260 via the lever assembly discussed with regard to FIGS. 1 through 4.

The check valve inlet seal member 263 provides a lower annular sealing surface of the differential pressure shear-seal type to establish a seal interface area 263 that surrounds the central inlet aperture defined by wall 240a of the disk 240. It can be seen from FIG. 5 that the check valve inlet seal member 263 includes an elastomeric seal member 263b of the O-ring type for establishing fluidtight engagement with the lower portion of the check valve sleeve 261 in which the seal member 263 is slidably received, as noted earlier. The poppet biasing spring 266, maintained in a compressed condition, holds the check valve inlet seal member 263 against the disk 240 and also holds the poppet 262 in sealing engagement with the upper seat end of the check valve sleeve 261.

The sleeve 261 in turn is forced downwardly by the push rod biasing spring 206, also maintained in a compressed condition, which has its upper end bearing against the enlarged center portion 202 of the push rod 201. With the check valve assembly 260 in a closed condition, as illustrated in FIG. 5, the force of the push rod biasing spring 206 holds the upper end of the check valve sleeve 261 in engagement with the poppet 260 biased against it by spring 266. The biasing spring 266, in turn, holds the check valve inlet seal member 263 in engagement with the disk 240 to establish the fluidtight sealing interface area 263a. When the rotor 220 is rotated, a rotational shear-type seal will be established at the sealing interface area 263a between the rotating seal member 263 and the non-rotating disk 240.

Figure 6:
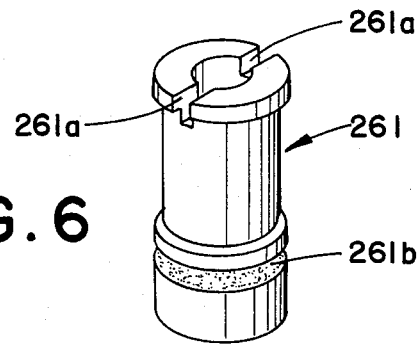
FIG. 6 is a perspective view of an element of the valve illustrated in FIG. 5.

The sleeve 261 is shown more clearly in FIG. 6 to have opposed fluid conduit grooves 261a that permit fluid flow through the valve when the poppet 262 is forced to an open position by downward movement of the push rod 201 in a manner similar to that discussed with regard to FIGS. 1 through 4. Also, an elastomeric seal 261b of the O-ring type establishes a fluidtight relationship between the rotor 220 and the sleeve 261, as illustrated in FIG. 5.

The second embodiment of the invention as illustrated and discussed with regard to FIGS. 5 and 6, in providing a rotor 220 that is rotationally supported solely by the cap member 280, permits the cap member 280 and the rotor 220 to be removed as a unit, thereby facilitating easy access to the disk 240. Further, a slight misalignment between the cap member 280 and the valve body 210 can be accommodated without potential binding of the rotor 220, since such misalignment can be taken up by limited translational sliding between the seal member 263 and the disk 240 at the interface area 263a. Further, since the rotor 220 is not journaled in the body 210, machining of the valve is made easier, since there is no need for maintaining extremely accurate alignment between journaled, rotor-supporting portions of the cap and the body, as would be the case with the embodiment of FIGS. 1 through 4.

In summary, the valve in accordance with the present invention is easily maintainable as opposed to prior art selector valves, since the platelike member in the form of the metal disk 40 can be easily removed and replaced when worn. Also, the check valve assembly can be easily removed for replacement or calibration externally of the valve body 10. Further, the ball 110 provides a very low friction portion of the linkage between the handle 90 and the check valve 60 so that the valve 60 can be opened against high pressure fluid with a minimum of effort.

Finally, the use of the castellations 87, the pin 97, and the surfaces 96 and 98 carried on the rotatable graspable end 92 of the handle 90 permits a very flexible design for customizing the valve to a particular set of operating requirements.

Although a preferred embodiment of this invention has been shown and described, it should be understood that various modifications and rearrangements of the parts may be resorted to without departing from the scope of the invention as disclosed and claimed herein.

What is claimed is:

1. In a valve having a leverlike operating handle pivotally mounted on the valve, and a linearly movable push rod element actuated by the handle and extending into the interior of the valve to engage and operate a check valve assembly contained therein, the improvement comprising a rigid ball loosely retained between the handle and the push rod by cage-forming elements extending from the valve and surrounding said ball, load bearing areas of contact between said ball and the push rod and said ball and the handle being minimized to limit frictional forces between said ball, the push rod and the handle, pivotal movement of the handle applying a moving force to the push rod solely via the ball to open the check valve assembly wherein the diameter of the ball is greater than the diameter of the push rod portion engaging the ball, wherein movement of the push rod is limited by engagement of the ball with a portion of the valve slidably receiving the push rod, such portion of the valve functioning as a stop to preclude movement of the ball and thus the push rod 2. A multiposition selector valve of the rotary type comprising:
    a valve body having a single inlet port and a plurality of outlet ports, the ports opening at the bottom of a circular bore provided on one face of the valve body, the inlet port being located at the center of the bore, the outlet ports being arranged around the inlet port at equal radial distances from the center of the bore;
    a flat metal disk of a diameter slightly less than the diameter of the bore, the disk being slidably received in the bore, the disk including a central aperture aligned with the inlet port and a plurality of outer apertures each generally aligned with a respective one of the outlet ports, the disk being removable from the valve body to facilitate maintenance of the valve.
    a check valve assembly having an inlet and an outlet, the check valve assembly being mounted within the central aperture of the metal disk, the inlet of the check valve being connected in fluidtight relationship to the inlet port;
    a rotor member rotatably mounted on the valve body for rotation on the center axis of the central aperture of the metal disk, the rotor member providing a conduit having an inlet end and an outlet end, the inlet end of the conduit being connected in fluidtight relationship to the outlet of the check valve assembly, the outlet end of the conduit being connectable in fluidtight relationship to the outer apertures of the metal disk via a spring-biased seal member carried by the rotor and slidably engageable in fluidtight relationship with the metal disk as the rotor member is rotated, the seal member being forced by spring-biasing against that side of the disk adjacent the rotor member;
    a cap member fastened to the valve body and generally covering the rotor and the metal disk;
    a push rod member having an exposed end portion extending through the cap, the push rod member sliding axially along the axis of rotation of the rotor member to open the check valve assembly, a portion of the rotor extending through the cap member and surrounding the exposed end portion of the push rod, the said extended portion of the rotor acting as a linear movement permitting support bushing for the push rod; and
    a handle pivotally mounted on the said extended portion of the rotor, the handle rotating the rotor member and moving the push rod to open the check valve and thus provide fluid communication between the inlet port and a selected outlet port dependent on the position of the rotor member.

3. A selector valve according to claim 2, including elastomeric seal means positioned between the valve body and that side of said disk adjacent the valve body, the seal means providing fluidtight communication between said disk and the valve body generally at the interface area of said aperture and said outlet ports.

4. A selector valve according to claim 3, wherein said seal means comprises a plurality of elastomeric O-rings each positioned to surround and seal the interface area of one of said apertures in said disk and its associated outlet port provided by the valve body.

5. A selector valve according to claim 2, including elastomeric seal means engaging the outer peripheral edge of the disk to preclude fluid flow between said peripheral edge and adjacent portions of the valve body and the cap member.

6. A selector valve according to claim 2, wherein the check valve assembly is removable as a unit from the valve body to permit maintenance of the check valve assembly.

7. A selector valve according to claim 2, wherein the handle is an elongated leverlike element having a fulcrum point constituted by a pin joint provided by the said extended portion of the rotor, one end of the handle being graspable by the valve operator, the other end of the handle being engageable with the exposed end of the push rod, upward movement of the said one end of the handle pushing the push rod into the valve to open the check valve assembly, the said other end of the handle moving downwardly against the push rod, the revolving of the handle about the axis of rotation of the rotor member moving the seal element from one outlet port position to another.

8. A selector valve according to claim 7, wherein that portion of the cap member surrounding the extended portion of the rotor includes a plurality of raised castellations limiting the downward movement of said other end of the handle to preclude full opening of the check valve at at least some of the positions of the rotor member wherein the outlet of the conduit is not fully aligned with one of the outer apertures of the metal disk.

9. A selector valve according to claim 7, wherein a pin extends from that portion of the cap member surrounding the extended portion of the rotor member, the distal end of the pin supporting the handle at one of its positions to lock it in position when the check valve assembly is open.

10. A selector valve according to claim 9, wherein the handle is rotatable on its longitudinal axis to permit complete revolutions of the handle with the check valve assembly closed without interference with the pin, a flat portion on the handle being positioned by rotation of the handle, the flat portion of the handle being spaced from the end of the pin when the handle is positioned at said one of its positions to permit free movement of the handle past the pin.

11. A multiposition selector valve of the rotary type comprising:

a valve body having at least one inlet port and a plurality of outlet ports;

a flat metal disk mounted on the valve body, the disk including a central aperture aligned with the inlet port and a plurality of outer apertures each generally aligned with a respective one of the outlet ports, the disk being removable from the valve body to facilitate maintenance of the valve;

a check valve assembly having an inlet and an outlet, the check valve assembly being mounted adjacent the central aperture of the metal disk, the inlet of the check valve being connected in fluidtight relationship to the inlet port;

a rotor member rotatably mounted relative to the valve body for rotation on the center axis of the central aperture of the metal disk, the rotor member providing a conduit having an inlet end and an outlet end, the inlet end of the conduit being connected in fluidtight relationship to the outlet of the check valve assembly, the outlet end of the conduit being connectable in fluidtight relationship to the outer apertures of the metal disk via a spring-biased seal member carried by the rotor and slidably engageable in fluidtight relationship with the metal disk as the rotor member is rotated, the seal member being forced by spring-biasing against that side of the disk adjacent the rotor member;

a cap member fastened to the valve body and generally covering the rotor and the metal disk, the cap member journaling the rotor for rotation, the position of the cap member on the body determining the position of the rotor axis of rotation relative to the flat metal disk, the cap member constituting the sole means for journaling and rotationally supporting the rotor;

a push rod member having an exposed end portion extending through the cap, the push rod member sliding axially along the axis of rotation of the rotor member to open the check valve assembly; and a handle for rotating the rotor member and moving the push rod to open the check valve and thus provide fluid communication between the inlet port and a selected outlet port dependent on the position of the rotor member.

12. A selector valve according to claim 11, wherein the inlet of the check valve is constituted by a seal element engaging the plate in fluidtight relation to preclude leakage of fluid between said plate and said check valve inlet.

* * * * *